UNITED STATES PATENT OFFICE.

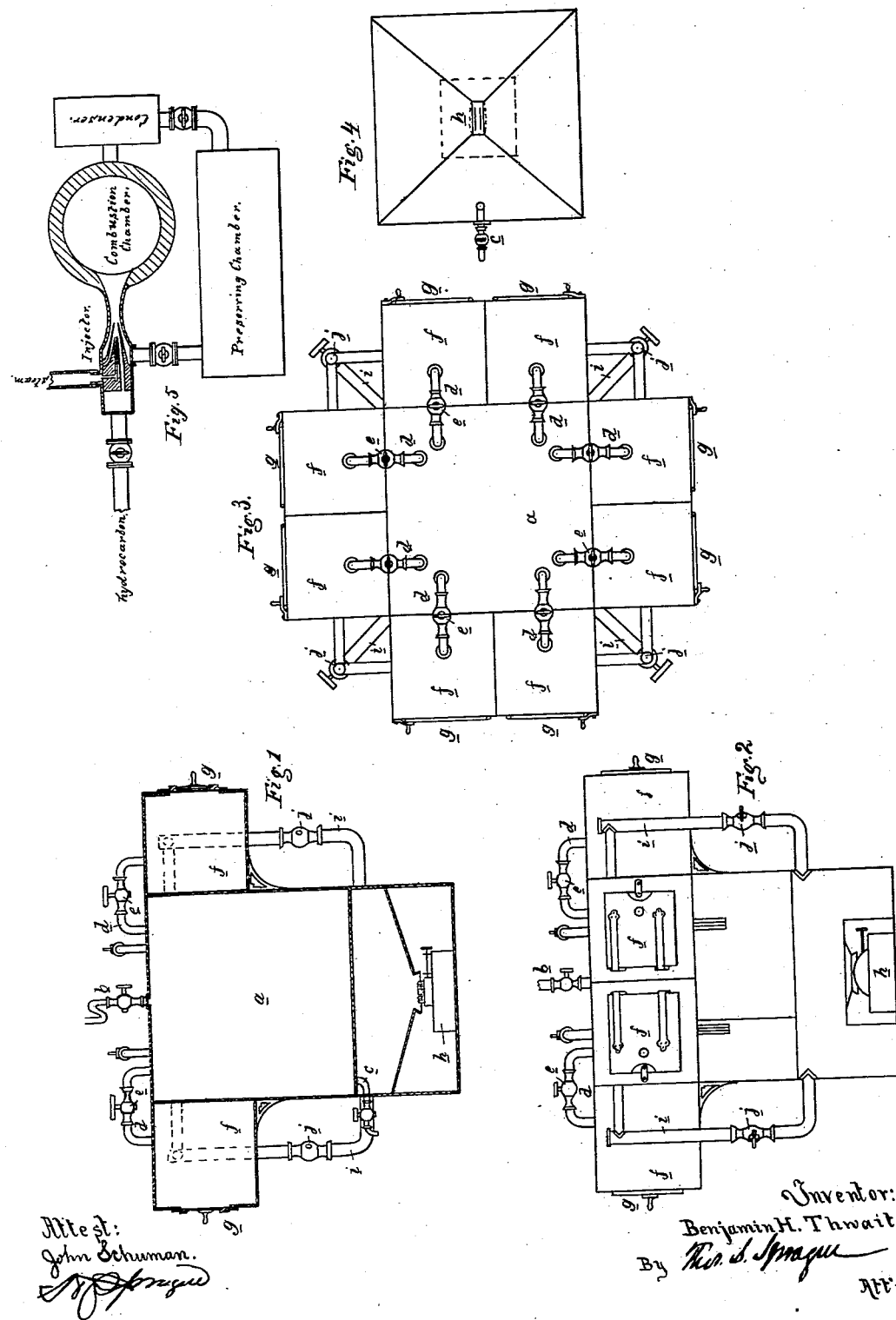

BENJAMIN HOWARTH THWAITE, OF LIVERPOOL, COUNTY OF LANCASTER, ENGLAND.

VACUUM-PRESERVING APPARATUS.

SPECIFICATION forming part of Letters Patent No. 344,223, dated June 22, 1886.

Application filed March 25, 1886. Serial No. 196,456. (No model.) Patented in England November 26, 1884, No. 16,565, and November 27, 1885, No. 14,552.

*To all whom it may concern:*

Be it known that I, BENJAMIN HOWARTH THWAITE, civil engineer, of Liverpool, in the county of Lancaster, England, Kingdom of Great Britain, have invented new and useful Improvements in Apparatus and Method of Preserving Animal and Vegetable Substances; and I hereby declare that the following is a full, clear, and exact description thereof, reference being had to the accompanying drawings, which form a part of this specification.

This invention relates to a new and useful improvement in apparatus for preventing the fermentation and putrefaction of animal and vegetable substances and maintaining their usefulness as foods, such apparatus being commonly called a "preservatory," for which I have obtained patents in England numbered and dated, respectively, 16,565, November 26, 1884, and 14,552, November 27, 1885.

My improved preservatory belongs to that class in which the articles are preserved by keeping them immersed in antiseptic apparatus for this purpose, and which is preferably adapted to produce and utilize air deoxygenated by means of combustion.

To this end my invention consists in the peculiar construction and assemblage of parts consisting of a generator of antiseptic gas or vapor, preferably a combustion-chamber, in which atmospheric air is desiccated and deoxygenated; of a series of air-tight food-chambers; of an aspirator connected with these chambers for withdrawing the atmospheric air therefrom, and of connections between the generator and the food-chambers, for conducting into the latter the antiseptic gases or vapors, all so constructed and arranged that the food-chambers may be used independently of each other or collectively.

My invention consists, further, in the peculiar construction and arrangement of the parts, whereby the antiseptic gases in the food-chambers may be kept there either under ordinary atmospheric pressure or under a higher pressure, all as hereinafter more fully described.

In the drawings, which accompany this specification, Figure 1 is a vertical cross-section of a preservatory constructed on my improved plan. Fig. 2 is a front elevation. Fig. 3 is a plan. Fig. 4 is a plan of the combustion-chamber. Fig. 5 is a diagram showing a more suitable device for generating gases of combustion when the apparatus is designed for a preservatory on a larger scale.

To carry out my invention in the special apparatus shown in the drawings, I proceed in the following manner: I construct a vessel or chamber, $a$, arranged to be air and water tight under atmospheric pressure. This vessel or chamber $a$, I almost fill with water by means of a suitable connection controlled by a valve, so as to resist any desired outward pressure. Attached to this water-chamber is one or several preserving-chambers, $f$, also constructed to withstand a pressure of water or air below that of one atmosphere, and connected to the water-vessel by means of pipes $d$, provided with tight-fitting valves or cocks $e$, the pipes entering the side of the vessel near its upper edge. Each of the chambers $f$ is provided with a tight-fitting door, $g$, made air-tight by lining the edges of the door with india-rubber, or by any other well-known manner. Immediately under or near the water-vessel I provide an ordinary chemical apparatus for generating or storing any gas I desire other than oxygen, but preferably carbon-dioxide, carbon-monoxide, hydrogen, and nitrogen, vapor of water, or vapor from liquid hydrocarbons. Generally I prefer to use any ordinary hydrocarbon, which I burn by the use of an ordinary wick-lamp, $h$. The products of combustion I conduct into the upper part of the already-described water-vessel $a$ by means of a connecting pipe or pipes, $i$, in which I provide a valve or cock, $j$. In order to withdraw the water from the water-vessel $a$, I provide an outlet, $c$, at its lower portion and with a tight-fitting cock.

When I desire to preserve any animal or vegetable substance by the apparatus above described, I proceed in the following manner: After having filled the vessel with water, which in hot and in sanitary districts may be mixed with any well-known disinfecting-liquid, and then placed the animal or vegetable substance or liquid to be preserved in any of the chambers other than the water-vessel described, and ascertained that the door was properly tight, I then open the cock connecting this chamber with the water-vessel, and, having seen that all the other cocks connecting this chamber with the water-vessel and the other cocks or valves connected with any other chamber are also quite closed, I then open the outlet-cock $c$, at the same time igniting the lamp $h$ and opening the valve $j$ in the pipe $i$, connecting the lamp $h$ with the preserving-chamber $f$. The resulting action is that the hydrocarbon vapors or products of partial or of complete combustion are withdrawn from the lamp $h$ into the preserving-chamber $f$, the air from the preserving-chamber being withdrawn into the water-vessel. The valve or cock $j$ in the connection $i$ from the lamp to the preserving-chamber $f$ should now be closed, and also the valve $e$, connecting the preserving-chamber $f$ with the water-vessel $a$. Additional water should now be poured into the water-vessel $a$, which will have the effect of driving out the air in the water-vessel. The lamp should now be again lighted and the connection opened between it and the water-vessel until it is entirely filled. The valve $j$ in the gas-connection should now be closed and that in the connection $d$ to the preserving-chamber opened, and the water should be poured into the water-vessel, with a funnel and water seal. The gas inclosed in the water-vessel $a$ will then be forced into the preserving-chamber and become considerably compressed. The cock or valve in connection should now be closed, and the substance to be preserved can be allowed to remain in the chamber for a considerable time in a fresh condition and without becoming oxidized or decomposed. I do not confine myself to the use of the water-vessel $a$ described for the purpose of extracting air from the preserving-chambers $f$, as I may use any other mechanical means of abstraction.

The apparatus aforedescribed is intended for ordinary domestic requirements. If it is desired to construct it on a larger scale, I propose using more efficient means for deoxygenating the air—such as the device shown in Fig. 5, wherein a special kind of injector is used, by which, with the aid of a jet of steam, the petroleum-oil (preferably refined) is aspired along with the vapor from any other liquid antiseptic mixed with the petroleum-oil from a cask—which I prefer to be of the Richter safety-economizer type—as well as the air which is drawn from the food-preserving chamber. The combustion of the petroleum-spray is effected in a specially air-tight refractory-lined chamber, (filled with checker brick-work, and over which is placed a steam-generator,) through which the products of combustion pass to the condenser and preserving-chamber, so that as fast as the air is drawn from the preserving-chamber by the injector its place is filled up with the pure products of hydrocarbon combustion, and as soon as the whole of the food-preserving chamber is filled up with the products of combustion the combustion is arrested. The temperature of the products of combustion is reduced by means of a suitable condenser, through which such products have to pass on their way to the food-preserving chamber, and when a large supply of antiseptic gas is required I collect same in a gas-holder so arranged that the gas collected therein can be forced from it under considerable pressure into the preserving-chamber, to which it is connected by pipes provided with valves.

I do not want to confine myself to the special devices shown and described; but I wish to be understood as claiming all such modifications which come within the spirit of my invention as embodied in the claims.

What I claim as my invention is—

1. In a device for the purpose described, the combination of an aspirator and a generator surrounded by and in direct contact with the preserving-chambers, valve-controlled passages for gases between the generator and aspirator, independent valve-controlled connections between said aspirator and each preserving-chamber, and independent connections between the generator and the preserving-chamber, substantially as described.

2. In a device for the purpose described, the combination of the hydraulic aspirator, generator, and preserving-chambers, connected as described, said aspirating-chamber being located directly over the generator or combustion-chamber, and operating substantially as and for the purpose specified.

3. In a device for the purpose described, the combination of an aspirator from which the flow of fluid draws the gases from a generator, a preserving-chamber connected by valve-controlled pipes, as described, and inlet and outlet pipes for water and gases to and from said aspirating-chamber, all arranged and operating substantially as herein shown and described.

BENJAMIN HOWARTH THWAITE.

Witnesses:
   WM. MARSDEN KERMODE,
      32 *Sun Street, Liverpool.*
   JAS. WARRY VICKERS,
      233 *Up. Parliament Street, Liverpool.*